(12) United States Patent
Ishii

(10) Patent No.: US 9,168,837 B2
(45) Date of Patent: Oct. 27, 2015

(54) VEHICLE AND METHOD OF CONTROLLING VEHICLE

(75) Inventor: Mitsunori Ishii, Toyota (JP)

(73) Assignees: TOYOTA JIDOSHA KABUSHIKI KAISHA, Toyota (JP); FUJI JUKOGYO KABUSHIKI KAISHA, Tokyo (JP)

( * ) Notice: Subject to any disclaimer, the term of this patent is extended or adjusted under 35 U.S.C. 154(b) by 540 days.

(21) Appl. No.: 13/390,265

(22) PCT Filed: May 12, 2010

(86) PCT No.: PCT/JP2010/058018
§ 371 (c)(1),
(2), (4) Date: Feb. 13, 2012

(87) PCT Pub. No.: WO2011/142004
PCT Pub. Date: Nov. 17, 2011

(65) Prior Publication Data
US 2012/0139490 A1    Jun. 7, 2012

(51) Int. Cl.
*H02J 7/00* (2006.01)
*H02J 7/02* (2006.01)
*B60L 1/00* (2006.01)
*B60L 11/18* (2006.01)
*B60L 3/00* (2006.01)
(Continued)

(52) U.S. Cl.
CPC ........... *B60L 11/1816* (2013.01); *B60L 3/0069* (2013.01); *B60L 3/04* (2013.01); *B60L 11/14* (2013.01); *B60L 11/1868* (2013.01); *B60L 2210/10* (2013.01); *B60L 2210/40* (2013.01); *B60L 2220/14* (2013.01); *B60L 2230/12* (2013.01); *B60L 2240/36* (2013.01); *B60L 2240/545* (2013.01); *B60L 2240/547* (2013.01); *B60L 2240/549* (2013.01); *B60L 2250/10* (2013.01); *Y02T 10/70* (2013.01);
(Continued)

(58) Field of Classification Search
CPC .............................. Y02T 90/121; Y02T 90/14
USPC .................................. 320/104, 109; 191/2, 8
See application file for complete search history.

(56) References Cited

U.S. PATENT DOCUMENTS

2013/0187600 A1 *    7/2013    Gale et al. ...................... 320/109

FOREIGN PATENT DOCUMENTS

| JP | A-11-220813 | 8/1999 |
|---|---|---|
| JP | A-2003-244832 | 8/2003 |

(Continued)

OTHER PUBLICATIONS

International Search Report mailed Aug. 24, 2010 issued in International Patent Application No. PCT/JP2010/058018 (with translation).

*Primary Examiner* — Richard Isla Rodas
*Assistant Examiner* — Michael DiBenedetto
(74) *Attorney, Agent, or Firm* — Oliff PLC

(57) ABSTRACT

A vehicle externally chargeable with electric power transmitted through a charging cable from an external power supply includes a chargeable power storage device, a charging device and a control device. The charging device supplies charge power to the power storage device using the electric power transmitted from the external power supply. The control device controls the charging device to limit the charge power based on the state of the power transmission path from the external power supply to the charging device. By this configuration, even when an extension cable is added by a user or when a failure occurs in the charging cable and the like, damage to the cable and influences upon surrounding devices due to excessive heat generation at the cable can be suppressed.

9 Claims, 5 Drawing Sheets

(51) Int. Cl.
 *B60L 3/04* (2006.01)
 *B60L 11/14* (2006.01)
(52) U.S. Cl.
 CPC ......... *Y02T 10/7005* (2013.01); *Y02T 10/7066* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/14* (2013.01)

(56) References Cited

FOREIGN PATENT DOCUMENTS

| | | |
|---|---|---|
| JP | A-2008-251355 | 10/2008 |
| JP | A-2008-252986 | 10/2008 |
| JP | A-2009-171733 | 7/2009 |
| JP | A-2010-61506 | 3/2010 |
| JP | A-2010-110055 | 5/2010 |

* cited by examiner

VEHICLE AND METHOD OF CONTROLLING VEHICLE

TECHNICAL FIELD

The present invention relates to a vehicle and a method of controlling the vehicle, and particularly to control of a vehicle chargeable with electric power from an external power supply outside of the vehicle.

BACKGROUND ART

In recent years, a vehicle equipped with a power storage device (for example, a secondary battery, a capacitor and the like) and running with the driving force generated from the electric power stored in the power storage device has received attention as an environmentally-friendly vehicle. Such a vehicle includes, for example, an electric vehicle, a hybrid vehicle, a fuel cell vehicle, and the like. There is a proposed technique for charging the power storage device mounted in the above-described vehicle by a commercial power supply having high power generation efficiency.

As a hybrid vehicle, there is also a known vehicle equipped with a power storage device that can be charged by a power supply external to the vehicle (hereinafter simply referred to as an "external power supply") (which will be hereinafter simply referred to as "external charging") as in the case of the electric vehicle. For example, the so-called "plug-in hybrid vehicle" is known which is provided with a power storage device that can be charged by a household power supply through the charging cable connecting between the power receptacle provided in the house and the charging port provided in the vehicle. According to this, an improvement in the fuel consumption efficiency of the hybrid vehicle can be expected.

Japanese Patent Laying-Open No. 11-220813 (PTL 1) discloses a technique regarding a relay connector for charging an electric vehicle that can be adapted to a plurality of types of connectors on the vehicle side which are different in specification. When the relay connector disclosed in Japanese Patent Laying-Open No. 11-220813 (PTL 1) is used, the existing power supply device for an electric vehicle can be adapted to a plurality of types of connectors on the vehicle side. Accordingly, the number of types of vehicles that can be charged can be increased.

CITATION LIST

Patent Literature

PTL 1: Japanese Patent Laying-Open No. 11-220813
PTL 2: Japanese Patent Laying-Open No. 2008-251355

SUMMARY OF INVENTION

Technical Problem

In the case where charge power is supplied from a standard power receptacle provided in the house as with a plug-in hybrid vehicle, for example, when the distance between the vehicle and the receptacle is longer than the dedicated charging cable, it may be conceivable to use a commercially available extension cord to connect between the charging cable and the receptacle.

For example, in the case where this extension cable is very long or relatively small in allowable current capacity, the charge current equivalent to that in the case where only the dedicated cable is used is applied for charging, which may cause damage to the extension cable due to heat generation in the extension cable or may exert influences on other devices dedicated to charging.

Furthermore, even when only a dedicated charging cable is used, failures such as a contact failure at the connection within the charging cable may cause the resistance value of the power transmission path to be increased as compared with the case of the normal situation, in which case influences resulting from heat generation and the like may be similarly exerted.

The present invention has been made in order to solve the above-described problems. An object of the present invention is to provide a charging system capable of adjusting charge power based on the state of the power transmission path in a vehicle chargeable with electric power from an external power supply outside of the vehicle.

Solution to Problem

A vehicle according to the present invention is externally chargeable with electric power transmitted through a charging cable from an external power supply, and includes a chargeable power storage device, a charging device and a control device. The charging device supplies charge power to the power storage device using the electric power transmitted from the external power supply. The control device controls the charging device to limit the charge power based on a state of a power transmission path from the external power supply to the charging device.

Preferably, the control device limits the charge power based on a resistance value of the power transmission path.

Preferably, when the resistance value of the power transmission path is greater than a threshold value, the control device controls the charging device such that the charge power is decreased as the resistance value of the power transmission path increases.

Preferably, the vehicle further includes an inlet for connecting the charging cable, and a power line connecting the inlet and the charging device. The power transmission path includes the charging cable and the power line. The control device limits the charge power in accordance with a magnitude of a remaining resistance value obtained by subtracting a resistance value of the power line and a resistance value of the charging cable from a resistance value of the entire power transmission path.

Preferably, the control device calculates the resistance value of the power transmission path based on a voltage and a current of the electric power transmitted from the external power supply at a time of external charging.

Preferably, the control device calculates the resistance value of the power transmission path and limits the charge power based on the calculated resistance value, while performing external charging.

Preferably, the control device performs test charging for calculating the resistance value of the power transmission path prior to full-scale charging, to set limitation on the charge power based on the calculated resistance value, and then, starts full-scale charging.

Preferably, the control device limits the charge power based on power consumption of the power transmission path.

Preferably, when the power consumption of the power transmission path is greater than a threshold value, the control device controls the charging device such that the charge power is decreased as the power consumption of the power transmission path increases.

Preferably, the control device corrects a limiting amount of the charge power based on an outside air temperature outside of the vehicle.

Preferably, the control device corrects the limiting amount of the charge power such that the charge power is decreased as the outside air temperature is getting higher.

Preferably, the control device limits a charge current output from the charging device based on the state of the power transmission path.

Preferably, the control device determines a limiting amount of the charge current using a predetermined map corresponding to the state of the power transmission path.

Preferably, the vehicle further includes a warning device for notifying that the charge power is limited.

The method of controlling a vehicle according to the present invention provides a method of controlling a vehicle that is externally chargeable with electric power transmitted from an external power supply. The vehicle includes a chargeable power storage device, and a charging device for supplying charge power to the power storage device using the electric power transmitted from the external power supply. The method includes the steps of detecting a state of a power transmission path from the external power supply to the charging device; determining a limiting amount of the charge power based on the detected state of the power transmission path; and generating a control command for controlling the charging device based on the determined limiting amount of the charge power.

Advantageous Effects of Invention

According to the present invention, in a vehicle chargeable with electric power from an external power supply outside of the vehicle, a charging system capable of adjusting the charge power based on the state of a power transmission path can be provided.

DESCRIPTION OF EMBODIMENTS

Figure 1:
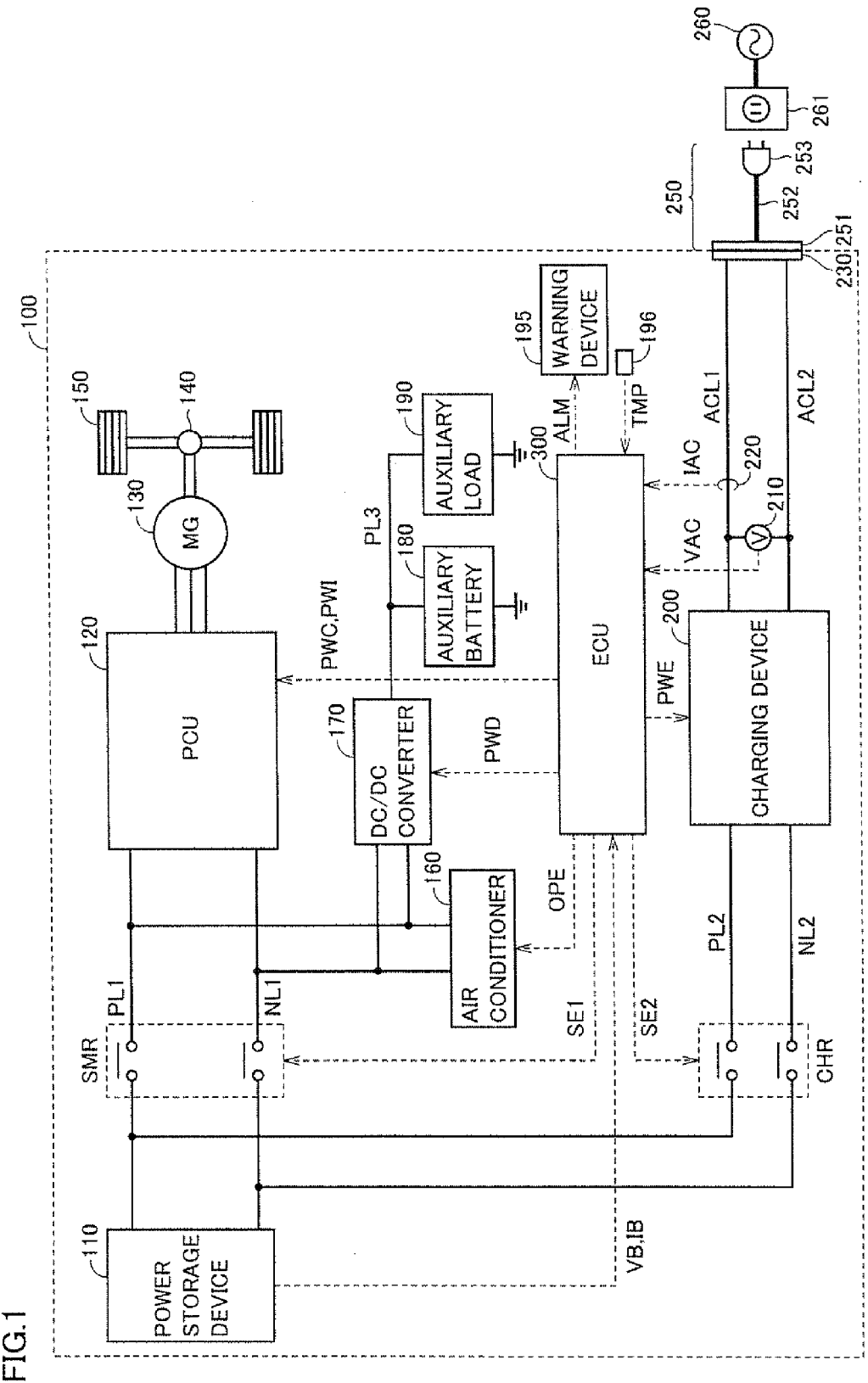
FIG. 1 is an entire block diagram of a vehicle in accordance with the present embodiment.

The embodiments of the present invention will be hereinafter described in detail with reference to the accompanying drawings, in which the same or corresponding components are designated by the same reference characters, and description thereof will not be repeated.

FIG. 1 is an entire block diagram of a vehicle 100 in accordance with the present embodiment.

Referring to FIG. 1, vehicle 100 includes a power storage device 110, a system main relay (SMR), a PCU (Power Control Unit) 120 serving as a drive device, a motor generator 130, a power transmission gear 140, a driving wheel 150, and an ECU (Electronic Control Unit) 300.

Power storage device 110 is a chargeable and dischargeable electric power storage element. Power storage device 110 is configured to include, for example, a secondary battery such as a lithium-ion battery, a nickel-metal hydride battery or a lead acid battery, or a power storage element such as an electric double layer capacitor.

Power storage device 110 is connected to PCU 120 through a power line PL1 and a ground line NL1. Power storage device 110 supplies the electric power for generating the driving force for vehicle 100 to PCU 120. Furthermore, power storage device 110 stores the electric power generated by motor generator 130. The output power of power storage device 110 is, for example, approximately 200V.

The relays included in system main relay SMR are disposed in power line PL1 and ground line NL1, respectively, each connecting power storage device 110 and PCU 120. System main relay SMR is controlled by a control signal SE1 from ECU 300 to switch between supply and interruption of the electric power between power storage device 110 and PCU 120.

Figure 2:
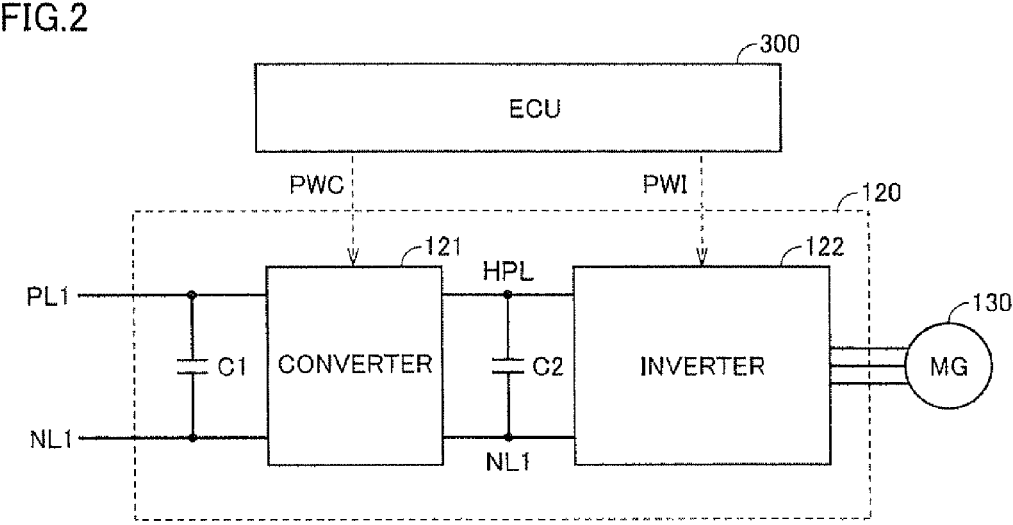
FIG. 2 is a diagram showing an example of the configuration within a PCU.

FIG. 2 is a diagram showing an example of the internal configuration of PCU 120.

Referring to FIG. 2, PCU 120 includes a converter 121, an inverter 122, and capacitors C1 and C2.

Based on a control signal PWC from ECU 300, converter 121 performs power conversion between power line PL1, ground line NL1 and power line HPL, ground line NL1.

Inverter 122 is connected to power line HPL and ground line NL1. Inverter 122 drives motor generator 130 based on a control signal PWI from ECU 300.

Capacitor C1 is provided between power line PL1 and ground line NL1, and reduces the voltage variation between power line PL1 and ground line NL1. Capacitor C2 is provided between power line HPL and ground line NL1, and reduces the voltage variation between power line HPL and ground line NL1.

Referring back to FIG. 1, motor generator 130 is an alternating-current (AC) rotating electric machine, and, for example, a permanent magnet type synchronous electric motor provided with a rotor into which a permanent magnet is incorporated.

The output torque of motor generator 130 is transmitted to driving wheel 150 through power transmission gear 140 including a reduction gear and a power split device, for driving vehicle 100. Motor generator 130 can generate electric power by the rotating force of driving wheel 150 during the regenerative braking operation of vehicle 100. PCU 120 then converts the generated electric power into charge power for power storage device 110.

Furthermore, in the hybrid vehicle equipped with an engine (not shown) in addition to motor generator 130, this engine and motor generator 130 are cooperatively operated to generate the required vehicle driving force. In this case, power storage device 110 can also be charged using the electric power generated by the rotation of the engine.

In other words, vehicle 100 according to the present embodiment represents a vehicle provided with an electric motor for generating the vehicle driving force, and includes a hybrid vehicle generating the vehicle driving force by the engine and the electric motor, an electric vehicle and a fuel cell vehicle which are not equipped with an engine, and the like.

Vehicle 100 further includes an air conditioner 160, a DC/DC converter 170, an auxiliary battery 180 and an auxiliary load 190 as a configuration of the low voltage system (auxiliary system).

DC/DC converter 170 is connected to power line PL1 and ground line NL1, and lowers a direct-current (DC) voltage supplied from power storage device 110 based on a control signal PWD from ECU 300. Then, DC/DC converter 170 supplies electric power through power line PL3 to the low voltage system of the entire vehicle such as auxiliary battery 180, auxiliary load 190 and ECU 300.

Auxiliary battery 180 typically includes a lead acid battery. The output voltage of auxiliary battery 180 is lower than the output voltage of power storage device 110, and, for example, approximately 12V.

Auxiliary load 190 includes, for example, a variety of lamps, a wiper, a heater, an audio unit, a navigation system, and the like.

Air conditioner 160 is connected to power line PL1 and ground line NL1. Air conditioner 160 is driven based on a control signal OPE from ECU 300 to perform air conditioning within a compartment of vehicle 100.

Vehicle 100 further includes a warning device 195 and a temperature sensor 196. When correction of the charge power is required during control of the charge power described later which is executed by ECU 300, warning device 195 notifies the user that correction of the charge power has been made. Warning device 195 which is, for example, an indication light, a warning buzzer, a display panel or the like notifies the user that correction of the charge power has been made by a visual or auditory method.

Temperature sensor 196 detects an outside air temperature TMP outside of vehicle 100 and outputs the detection result to ECU 300.

ECU 300 including a CPU (Central Processing Unit), a storage device and an input and output buffer which are not shown in FIG. 1 receives a signal from each sensor and the like and outputs a control signal to each device. ECU 300 also controls vehicle 100 and each device. It is to be noted that the above-described control is not limited to the process by software, but can be carried out by dedicated hardware (an electronic circuit).

ECU 300 outputs a control signal for controlling PCU 120, DC/DC converter 170, a charging device 200, and the like. Although FIG. 1 shows the configuration having one control device provided as ECU 300, the configuration of the control device is not limited thereto. For example, the configuration may be defined such that a control device is provided separately for each device to be controlled and for each function as with the control device controlling PCU 120 or the control device controlling charging device 200.

Furthermore, ECU 300 receives detection values of a battery voltage VB and a battery current IB from a sensor (not shown) included in power storage device 110. ECU 300 calculates the state of charge (hereinafter also referred to as an SOC) of power storage device 110 based on battery voltage VB and battery current IB.

Vehicle 100 includes a charging device 200, a voltage sensor 210, a current sensor 220, an inlet 230, and a charging relay CHR as a configuration for charging power storage device 110 with electric power from an external power supply 260.

Inlet 230 is provided on the body of vehicle 100 for receiving AC power from external power supply 260. A charging connector 251 of a charging cable 250 is connected to inlet 230. Then, a plug 253 of charging cable 250 is connected to a receptacle 261 of external power supply 260 (for example, such as a commercial power supply), so that the AC power from external power supply 260 is transmitted to vehicle 100 through a power line unit 252 of charging cable 250. In addition, a charging circuit interrupt device (hereinafter also referred to as a "CCID") for switching between supply and interruption of the electric power from external power supply 260 to vehicle 100 may be disposed in power line unit 252 of charging cable 250.

Charging device 200 is connected to inlet 230 through power lines ACL1 and ACL2. Charging device 200 is also connected to power storage device 110 by a power line PL2 and a ground line NL2 through charging relay CHR.

Charging device 200 is controlled by a control signal PWE from ECU 300 to convert the AC power supplied from inlet 230 into charge power for power storage device 110.

Charging relay CHR is disposed in each of power line PL2 and ground line NL2 each connecting power storage device 110 and charging device 200. Charging relay CHR is controlled based on control signal SE2 from ECU 300 to switch between supply and interruption of the electric power between power storage device 110 and charging device 200.

Voltage sensor 210 is connected between power lines ACL1 and ACL2. Voltage sensor 210 detects a voltage VAC of the AC power transmitted from external power supply 260 and outputs the detected value to ECU 300. Current sensor 220 is provided in power line ACL1. Current sensor 220 detects a current IAC flowing through power line ACL1 and outputs the detected value to ECU 300. It is to be noted that current sensor 220 may be provided in power line ACL2.

Figure 3:
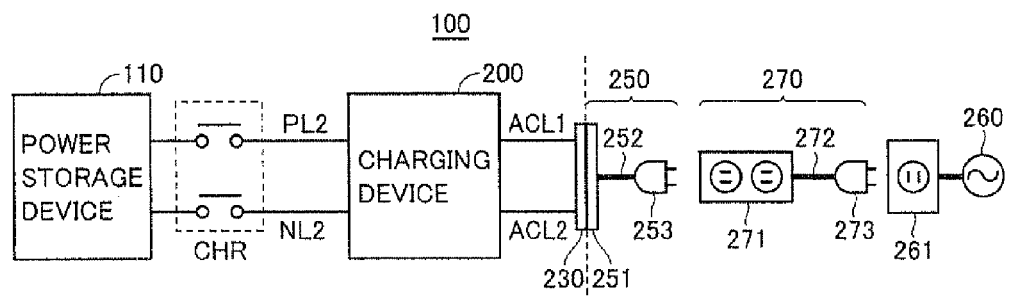
FIG. 3 is a diagram showing an example of the configuration of a power transmission path in the case where an extension cable is used.

In such a vehicle 100, since plug 253 of charging cable 250 is connected to a household receptacle 261 as described above, it has a standardized design. Thus, for example, when vehicle 100 is located at a distance from receptacle 261 and the length of charging cable 250 is not enough to allow connection of charging cable 250 to receptacle 261, the user may use a commercially available extension cable 270 to electrically connect charging cable 250 and receptacle 261, as shown in FIG. 3.

Extension cable 270 includes a power line unit 272 that is provided at one end with a receptacle 271 to which plug 253 of charging cable 250 can be connected, and at the other end with a plug 273 for connection to receptacle 261. In addition to the configuration as shown in FIG. 3, extension cable 270 may be configured like a cable reel in such a manner that power line unit 272 is wound around a drum.

In the case where extension cable 270 is used to connect vehicle 100 and external power supply 260 as described above, for example, when extension cable 270 is very long and the resistance value of power line unit 272 is relatively large, or when the allowable current capacity in each part of extension cable 270 is smaller than that of charging cable 250, power storage device 110 is charged with the same charge power as that in the case where only dedicated charging cable 250 is used for connection to external power supply 260, which may lead to excessive heat generation at extension cable 270 due to the current flowing through extension cable 270. Consequently, extension cable 270 may be damaged due to this heat or a short circuit and the like may occur in the electric wire within this extension cable 270, which may result in failures in the devices of vehicle 100, the devices of external power supply 260, and the like.

Furthermore, even in the case where extension cable 270 is not used, but, for example, in the case where charging cable 250 undergoes an increased resistance at the connection due to a connection failure between the electric wire and the terminal at charging connector 251 or plug 253, there may also be a possibility that charging cable 250 is damaged and the surrounding components are influenced.

Thus, in the present embodiment, in the vehicle chargeable from an external power supply, the state of the power transmission path from the charging device to the external power supply at the time of external charging is detected to perform charge power control for adjusting the charge power based on the detected state. Specifically, charging device 200 is controlled so as to limit the charge power in accordance with the resistance value and the power consumption of the power transmission path from the charging device to the external power supply that are calculated based on the voltage and the current of the charge power.

By such an approach, even when charging is carried out through an extension cable, or when charging is carried out in the state where a malfunction occurs in the charging cable, damages to the cable and influences upon the surrounding devices can be prevented by suppressing excessive heat generation in the cable.

Figure 4:
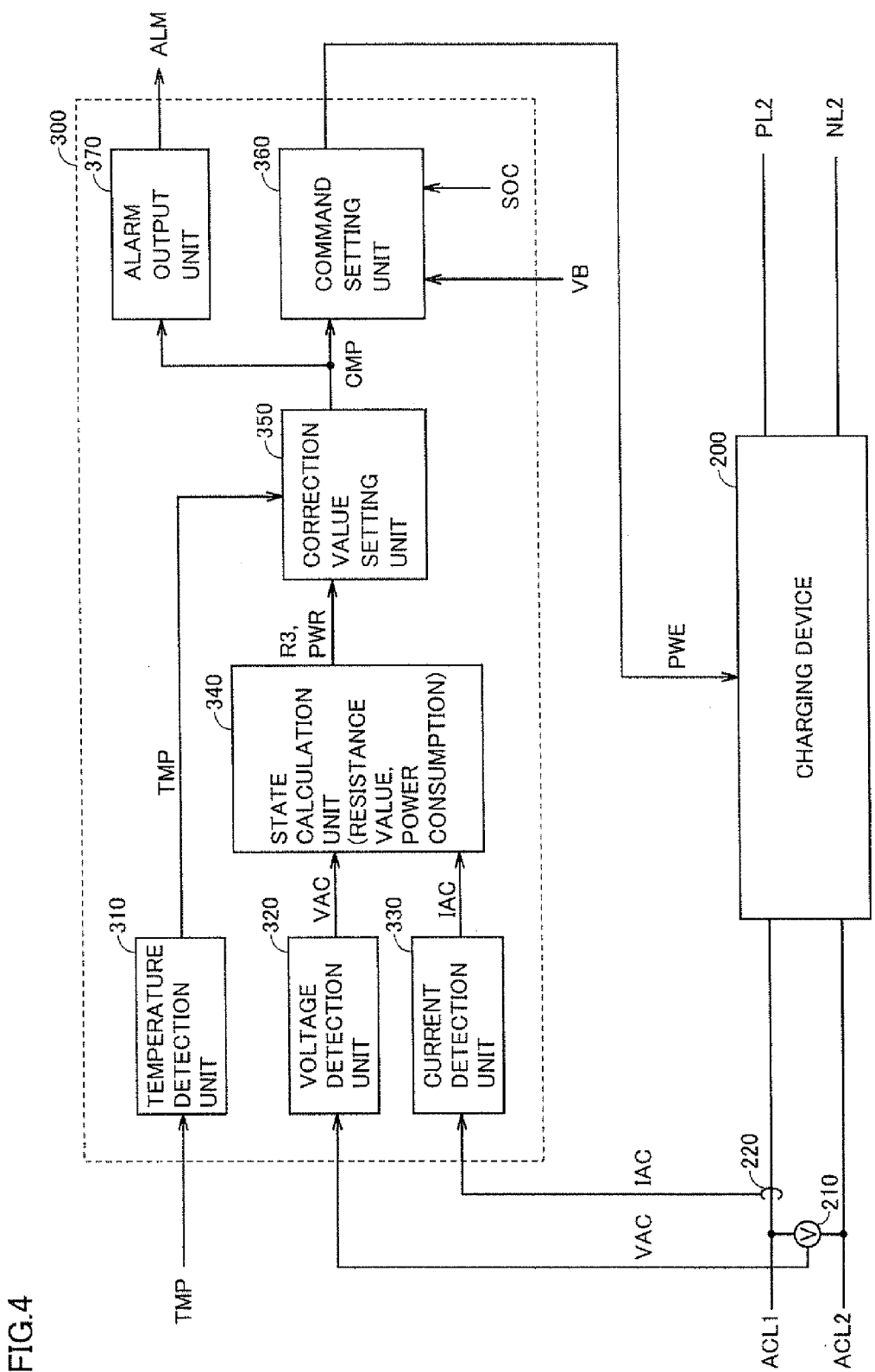
FIG. 4 is a functional block diagram for illustrating charge power control performed in the ECU in the present embodiment.

FIG. 4 is a functional block diagram for illustrating charge power control performed in ECU 300 in the present embodiment. Each functional block described in the functional block diagram in FIG. 4 is implemented by hardware or software processing by ECU 300.

Referring to FIGS. 1 and 4, ECU 300 includes a temperature detection unit 310, a voltage detection unit 320, a current detection unit 330, a state calculation unit 340, a correction value setting unit 350, a command setting unit 360, and an alarm output unit 370.

Temperature detection unit 310 receives the detection value of outside air temperature TMP from temperature sensor 196. Then, temperature detection unit 310 outputs the received outside air temperature TMP to correction value setting unit 350.

Voltage detection unit 320 receives the detection value of voltage VAC of the AC power transmitted from external power supply 260 that is detected by voltage sensor 210. Then, voltage detection unit 320 outputs the received voltage VAC to state calculation unit 340.

Current detection unit 330 receives the detection value of current IAC flowing through power line ACL1 that is detected by current sensor 220. Then, current detection unit 330 outputs the received current IAC to state calculation unit 340.

State calculation unit 340 receives voltage VAC and current IAC from voltage detection unit 320 and current detection unit 330, respectively. Then, based on these pieces of information, state calculation unit 340 calculates the state of the power transmission path from charging device 200 to external power supply 260. Specifically, the state of the power transmission path includes a resistance value and power consumption. An example of the specific calculation of these states in state calculation unit 340 will be hereinafter described.

In the state where external power supply 260 and inlet 230 are electrically connected to each other through charging cable 250, the initial value of voltage VAC before the start of charging, that is, before the charge current flows, is assumed to be V0. Furthermore, the values of voltage VAC and current IAC after the start of charging is assumed to be VCH and ICH, respectively. Thus, a resistance value R0 of the entire power transmission path from charging device 200 to external power supply 260 can be calculated by Equation (1).

$$R0 = (V0 - VCH)/ICH \quad (1)$$

In this case, assuming that the resistance value of power lines ACL1 and ACL2 is R1 and the standard resistance value of charging cable 250 in the normal situation is R2, an additional resistance value R3 at extension cable 270 and other connections is calculated based on Equation (1) as described below.

$$R3 = R0 - (R1 + R2) \quad (2)$$
$$= (V0 - VCH)/ICH - (R1 + R2)$$

By comparing additional resistance value R3 calculated in this way with the predetermined threshold value, it can be determined whether an extension cable may be used or not, or whether a contact failure at the connection and the like may occur or not.

Furthermore, power consumption PWR consumed by this additional resistance value R3 can be calculated using Equation (2) as described below.

$$PWR = ICH^2 \cdot R3 \quad (3)$$
$$= (V0 - VCH) \cdot ICH - ICH^2 \cdot (R1 + R2)$$

Power consumption PWR calculated in this way can be an indicator showing heat generation caused by the additional resistance value.

State calculation unit 340 outputs, to correction value setting unit 350, additional resistance value R3 calculated as described above and power consumption PWR by additional resistance value R3.

Correction value setting unit 350 receives inputs of outside air temperature TMP from temperature detection unit 310, resistance value R3 and power consumption PWR from state calculation unit 340. Then, based on these pieces of information, correction value setting unit 350 uses a predetermined map and equations to set the correction value for limiting the charge power.

In addition, in order to limit the charge power, at least one of the output voltage and the output current of charging device 200 is to be limited. As an example of control of charging device 200, the voltage and the current are controlled by constant power control when the SOC of power storage device 110 is relatively low, while the electric power is controlled by the charge current as constant voltage control in the latter stage of charging at the time when the SOC increases. Since it is basically necessary to set the output voltage of charging device 200 to be slightly higher than the voltage of power storage device 110 at the time of charging of power storage device 110, the charge power is limited generally by limiting the charge current. The following is an explanation of an example in the case where the charge current is limited.

Figure 5:
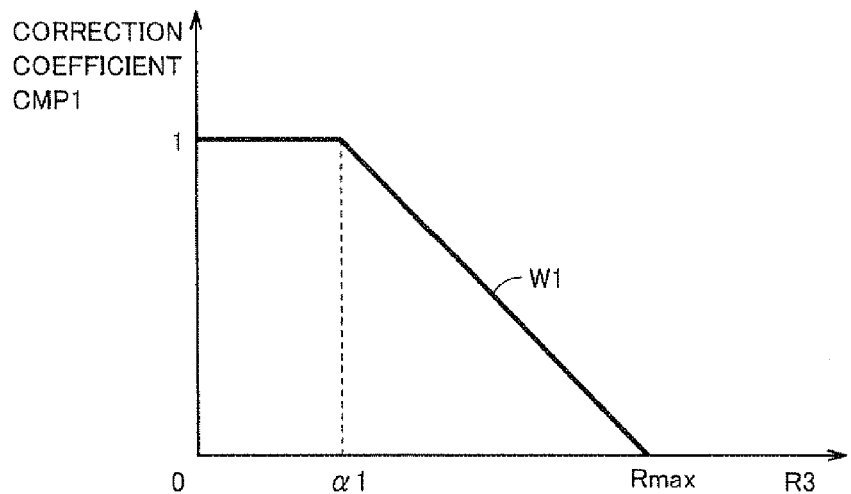
FIG. 5 is a diagram showing an example of a map for setting a correction coefficient of the charge power based on the resistance value of the power transmission path.
Figure 6:
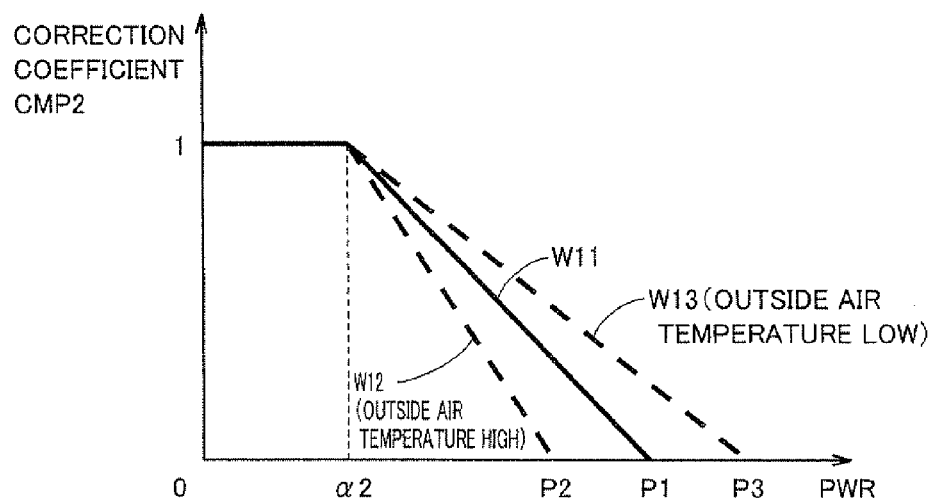
FIG. 6 is a diagram showing an example of the map for setting the correction coefficient of the charge power based on the power consumption of the power transmission path.

FIGS. 5 and 6 each show an example of the map for setting a correction value in correction value setting unit 350.

FIG. 5 is a diagram showing an example of the map for setting a correction coefficient CMP1 of the charge current based on additional resistance value R3 of the power transmission path. Referring to FIG. 5, when additional resistance value R3 calculated by state calculation unit 340 is smaller than a threshold value α1, correction value setting unit 350 does not limit the charge current, and thus, sets correction coefficient CMP1 at 1. Then, when additional resistance value R3 exceeds threshold value α1, correction value setting unit 350 sets correction coefficient CMP1 at a value in a range between 0 and 1 such that the larger the exceeded resistance value is, the smaller correction coefficient CMP1 is (a line W1 in FIG. 5). Correction coefficient CMP1 may be decreased linearly as shown in FIG. 5 or may be decreased in a manner of a curved line or in a stepwise manner. Furthermore, Rmax in FIG. 5 corresponds to the maximum resistance value that does not allow charging and is determined based on the rated impedance which can be connected to external power supply 260 and charging device 200.

FIG. 6 is a diagram showing an example of the map for setting a correction coefficient CMP2 of the charge current based on the power consumption by additional resistance value R3 of the power transmission path. Referring to FIG. 6, when consumption power PWR by additional resistance value R3 calculated by state calculation unit 340 is smaller than a threshold value α2, correction value setting unit 350 does not limit the charge current, and thus, sets correction coefficient CMP2 at 1. Then, when consumption power PWR exceeds threshold value α2, correction value setting unit 350 sets correction coefficient CMP2 at a value in a range between 0 and 1 such that the larger the exceeded consumption power is, the smaller correction coefficient CMP2 is (a solid line W11 in FIG. 6). As with correction coefficient CMP1, correction coefficient CMP2 may also be decreased linearly as shown in FIG. 6 or may be decreased in a manner of a curved line or in a stepwise manner.

Furthermore, in order to set correction coefficient CMP2 based on power consumption PWR, correction coefficient CMP2 may be further changed in accordance with outside air temperature TMP. As described above, power consumption PWR can be an indicator showing heat generation by additional resistance value R3. When the outside air temperature is relatively low, the amount of heat discharged to the surroundings is increased. Accordingly, substantial temperature rise of the additional resistance component by this power consumption is suppressed. On the other hand, when the outside air temperature is relatively high, the amount of heat discharged to the surroundings is decreased. Accordingly, the substantial temperature rise of the additional resistance component becomes relatively great on the contrary. Thus, as shown in FIG. 6, the higher outside air temperature TMP is, the smaller correction coefficient CMP2 is set, that is, the limiting amount of the charge current is set to be increased (a dashed line W12 in FIG. 6). Also, the lower outside air temperature TMP is, the larger correction coefficient CMP2 is set, that is, the limiting amount of the charge current is set to be decreased (a dashed line W13 in FIG. 6).

Then, correction value setting unit 350 uses correction coefficients CMP1 and CMP2 calculated in this way to calculate a total correction coefficient CMP as described below, and outputs the calculated correction coefficient CMP to command setting unit 360 and alarm output unit 370.

$$CMP = CMP1 \cdot CMP2 \quad (4)$$

In this case, $0 \le CMP1 \le 1$ and $0 \le CMP2 \le 1$.

With regard to the above-described correction coefficients CMP1 and CMP2, both of these correction coefficients do not necessarily need to be used for correction, but at least one of the correction coefficients only has to be used. Furthermore, any correction coefficient based on the state other than the above state can be further employed.

Referring back to FIG. 4, command setting unit 360 receives battery voltage VB from power storage device 110 or the SOC calculated based on this battery voltage VB. Then, command setting unit 360 calculates the required charge current based on these pieces of information and sets control signal PWE of charging device 200 for achieving this charge current. In this case, command setting unit 360 limits the charge current output from charging device 200 by multiplying the above-described calculated charge current by correction coefficient CMP received from correction value setting unit 350.

Alarm output unit 370 receives correction coefficient CMP from correction value setting unit 350. Then, when correction coefficient CMP is smaller than 1, that is, when additional resistance value R3 or power consumption PWR is greater than a prescribed threshold value, alarm output unit 370 outputs an alarm signal ALM to warning device 195 for issuing an alarm for the purpose of calling the user's attention.

Figure 7:
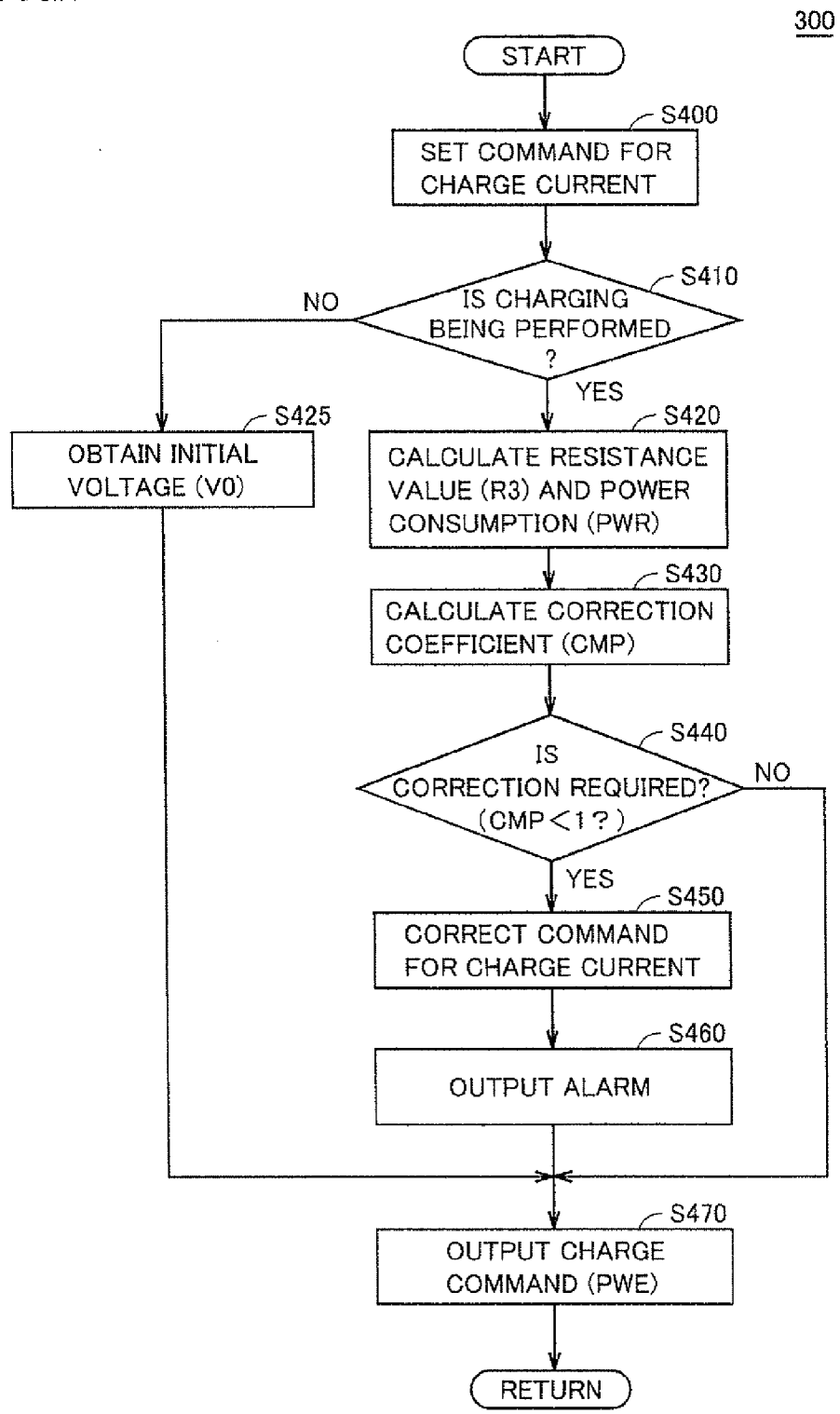
FIG. 7 is a flowchart for illustrating the details of the charge power control process performed in the ECU in the present embodiment.

FIG. 7 is a flowchart for illustrating the details of the charge power control process performed in ECU 300 in the present embodiment. Each step in the flowchart shown in FIG. 7 is implemented by calling the program stored in ECU 300 in advance from a main routine and executing this program in predetermined cycles. Alternatively, in some of the steps, the process can be implemented by constructing dedicated hardware (an electronic circuit).

Referring to FIGS. 1 and 7, when ECU 300 detects that external power supply 260 is connected through charging cable 250, ECU 300 sets the command value of the charge current based on battery voltage VB or the SOC of power storage device 110 in step (which will be hereinafter abbreviated as S) 400.

Then, ECU 300 determines in S410 whether or not charging device 200 has already been activated and charging is currently being performed.

If charging is not yet performed (NO in S410), ECU 300 obtains, in S425, an initial voltage V0 on power lines ACL1 and ACL2 through which no charge current flows. Then, ECU 300 proceeds the process to S470 to generate control signal PWE that allows achievement of the command value of the charge current set in S400, and then, drives charging device 200.

On the other hand, if charging is already being performed (YES in S410), the process proceeds to S420, in which ECU 300 calculates additional resistance value R3 and power consumption PWR using the above-described Equations (2) and (3) based on voltage VAC and current IAC detected by voltage sensor 210 and current sensor 220, respectively.

Then, in S430, ECU 300 calculates correction coefficient CMP of the charge current, for example, by using a map as shown in FIGS. 5 and 6 based on additional resistance value R3, power consumption PWR and outside air temperature TMP.

In S440, ECU 300 determines whether correction of the charge power is required or not, that is, whether or not correction coefficient CMP calculated in S430 is smaller than 1.

If correction coefficient CMP is 1 and the charge current does not need to be limited (NO in S440), ECU 300 proceeds the process to S470, to generate control signal PWE that allows achievement of the command value of the charge current set in S400, and then, drives charging device 200.

If correction coefficient CMP is smaller than 1 and the charge current needs to be limited (YES in S440), the process proceeds to S450 in which ECU 300 limits the charge current by multiplying the charge current set in S400 by correction coefficient CMP calculated in S430.

Then, in S460, ECU 300 outputs alarm signal ALM to warning device 195 to notify the user that the charge power is corrected.

Then, in S470, ECU 300 generates control signal PWE that allows achievement of the limited charge power, and then, drives charging device 200.

By performing control in accordance with the above-described processes, it becomes possible to adjust the charge power based on the state of the power transmission path in the vehicle that can be charged with the electric power from the external power supply outside of the vehicle. Accordingly, even when an extension cable is added by the user or when a failure occurs in the charging cable and the like, damage to the cable and influences upon the surrounding devices due to excessive heat generation at the cable can be suppressed.

In the above description, an explanation has been made with regard to the method for, while performing charging, dynamically calculating additional resistance value R3 and limiting the charge power based on additional resistance value R3 obtained by this calculation. Instead of this method, in order to calculate additional resistance value R3, for example, test charging by low electric power may be performed for a short period of time before performing full-scale charging, to set limitation on the charge power based on the obtained resistance value R3, and then, full-scale charging may be started. The configuration defined as described above can prevent occurrence of a failure and the like that may be caused by starting charging with large electric power from the beginning, for example, in the case where charging cable 250 has defects.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100 vehicle, 110 power storage device, 120 PCU, 121 converter, 122 inverter, 130 motor generator, 140 power transmission gear, 150 driving wheel, 160 air conditioner, 170 DC/DC converter, 180 auxiliary battery, 190 auxiliary load, 195 warning device, 196 temperature sensor, 200 charging device, 210 voltage sensor, 220 current sensor, 230 inlet, 250 charging cable, 251 charging connector, 252, 272 power line unit, 253, 273 plug, 260 external power supply, 261, 271 receptacle, 270 extension cable, 300 ECU, 310 temperature detection unit, 320 voltage detection unit, 330 current detection unit, 340 state calculation unit, 350 correction value setting unit, 360 command setting unit, 370 alarm output unit, ACL1, ACL2, HPL, PL1 to PL3 power line, C1, C2 capacitor, CHR charging relay, NL1, NL2 ground line, SMR system main relay.

The invention claimed is:

1. A vehicle externally chargeable with electric power transmitted through a charging cable from an external power supply, said vehicle comprising:
   an inlet to which said charging cable is connected;
   a chargeable power storage device;
   a charging device for supplying charge power to said power storage device using the electric power transmitted from said external power supply;
   a power line connecting said inlet and said charging device; and
   a control device for controlling said charging device to limit said charge power based on a resistance value of a power transmission path from said external power supply to said charging device, wherein
   said power transmission path includes said charging cable and said power line;
   when the resistance value of said power transmission path is greater than a threshold value, said control device controls said charging device such that said charge power is decreased as the resistance value of said power transmission path increases, and said control device limits said charge power based on a measured resistance with a magnitude of a remaining resistance value obtained by subtracting a resistance value of said power line and a resistance value of said charging cable from a resistance value of entire said power transmission path.

2. The vehicle according to claim 1, wherein said control device calculates the resistance value of said power transmission path based on a voltage and a current of the electric power transmitted from said external power supply at a time of external charging.

3. The vehicle according to claim 2, wherein said control device calculates the resistance value of said power transmission path and limits said charge power based on the calculated resistance value, while performing external charging.

4. The vehicle according to claim 2, wherein said control device performs test charging for calculating the resistance value of said power transmission path prior to full-scale charging, to set limitation on said charge power based on the calculated resistance value, and then, starts full-scale charging.

5. The vehicle according to claim 1, wherein when power consumption of said remaining resistance is greater than a threshold value, said control device controls said charging device such that said charge power is decreased as the power consumption of said remaining resistance increases.

6. The vehicle according to claim 5, wherein said control device corrects a limiting amount of said charge power such that said charge power is decreased as an outside air temperature outside of said vehicle is getting higher.

7. The vehicle according to claim 1, wherein said control device determines a limiting amount of a charge current output from said charging device using a predetermined map corresponding to said remaining resistance value, and limits said charge power by limiting said charge current using the limiting amount of said charge current.

8. The vehicle according to claim 1, further comprising a warning device for notifying that said charge power is limited.

9. A method of controlling a vehicle externally chargeable with electric power transmitted through a charging cable from an external power supply,
   said vehicle including
   an inlet to which said charging cable is connected;
   a chargeable power storage device;
   a charging device for supplying charge power to said power storage device using the electric power transmitted from said external power supply; and
   a power line connecting said inlet and said charging device,
   said method comprising the steps of:
   detecting a resistance value of a power transmission path from said external power supply to said charging device;
   determining a limiting amount of said charge power based on the detected resistance value of said power transmission path; and
   generating a control command for controlling said charging device based on the determined limiting amount of said charge power, wherein
   said power transmission path includes said charging cable and said power line, said determining step including the step of:
   and determining the limiting amount of said charge power based on a measured resistance with a magnitude of a remaining resistance value obtained by subtracting a resistance value of said power line and a resistance value of said charging cable from a resistance value of entire said power transmission path, such that said charge power is decreased as the resistance value of said power transmission path increases, when the resistance value of said power transmission path is greater than a threshold value.

* * * * *